Jan. 2, 1951 H. T. BUSSMANN Re. 23,315

ELECTRICAL PROTECTIVE DEVICE

Original Filed April 25, 1938

INVENTOR.
HENRY T. BUSSMANN

BY

Roy M. Eilers
ATTORNEY.

Reissued Jan. 2, 1951

Re. 23,315

UNITED STATES PATENT OFFICE 23,315

ELECTRICAL PROTECTIVE DEVICE

Henry T. Bussmann, St. Louis, Mo.

Original No. 2,275,403, dated March 10, 1942, Serial No. 204,206, April 25, 1938. Application for reissue March 23, 1942, Serial No. 435,910

15 Claims. (Cl. 200—123)

Figure 1:
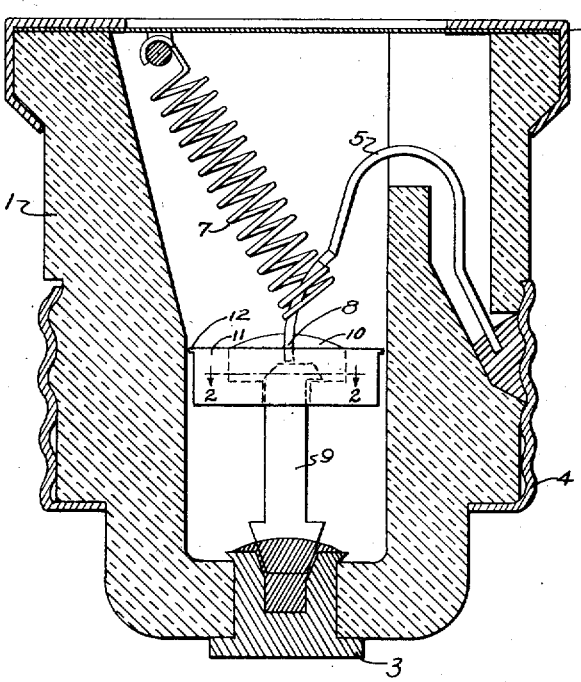

Matter enclosed in heavy brackets [ ] appears in the original patent but forms no part of this reissue specification; matter printed in italics indicates the additions made by reissue

My invention relates to protective devices for electric circuits designed to open the circuit on excess currents which, if continued, might be harmful.

An object of my invention is to provide a protector which will adequately protect against harmful overloads and have such time lag as to also protect against interruption of service on harmful overloads.

Another object of my invention is to provide a protector for electric circuits having these desired safety and time-lag characteristics which can be manufactured at a cost not greatly in excess of that of a standard fuse of the same rating.

Any circuit can carry an overload for some time without injury, the greater the overload the shorter the time, short circuits may cause damage almost instantaneously. A protector which provides adequate protection without the expense and annoyance of needless interruptions, should, accordingly, carry small overloads for relatively long times but blow quickly on heavy overloads and almost instantly on short circuits. In other words, the time lag of the protector should be comparable to, but somewhat less than, that of the circuit to be protected.

Protectors for motor circuits require a greater time lag than is ordinarily necessary for other circuits because of the heavy starting currents of the motors. If a protector having the time lag desirable for motor circuits be used on a circuit not requiring so much *time* lag no lessening of protection will result. If, however, a device having an adequate time lag for the circuit to be protected can be obtained at less cost than one having an unnecessarily great time lag there would be advantage in using it.

Branch circuits such as are ordinarily protected by devices of 15, 20 or 25 ampere 125 volt ratings are examples of circuits which do not require the long time lags necessary in protectors for motor circuits. There are very few 125 volt motors of ratings in this range and if any motors are used on circuits of this type, they are small ones the starting currents of which could be handled by protective devices having less time lag than necessary in protectors of these ratings for purely motor circuits.

By my invention I am able to provide at low cost a protector suitable for use on such circuits as described which has a long time lag at low overloads, a quick blow at higher overloads and a practically instantaneous blow on short circuits.

In order to provide in a unitary structure both long time lag and practically instantaneous blowing, as may be desired according to the condition of overload in the circuit, protectors have been used having a thermally-controlled mechanically-operable circuit interrupter and a fuse link in the same device. The mechanical interrupter is designed to open with long time lags on overloads up to a predetermined value and the fuse link to open in short times on overloads above this value and virtually instantaneously on short circuits.

In my application, Serial No. 676,500 now Patent No. 2,111,749, I have shown and described a protective device of this type. My present invention relates to the same general type of device.

Figure 2:
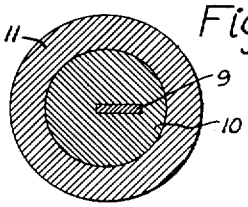

In the single sheet of drawings Figure 1 shows a view of a preferred form of protector embodying my invention, a part of the enclosure being cut away. Fig. 2 shows a cross-sectional view along the line 2—2 of Fig. 1.

In Fig. 1 a hollow body member 1 of insulating material has a closure member 2 and contact terminals 3 and 4 thereon. A fuse link 5 and a thermally-controlled mechanically-operable circuit interrupter having operating means 7 are enclosed within the body member 1 and serve to electrically connect the contact terminals 3 and 4. The interrupter also includes a movable contact member 8 comprising an end portion of the fuse link 5, a heating element 9 and a mass of heat softenable material 10 normally holding the contact member 8 in electrical connection with the heating element 9.

I use a much larger mass of the heat softenable material 10 than is required to electrically connect the link and the heating element. This is in order to make use of the excess mass of the heat softenable material as a means of increasing the time lag. The greater the mass of the heat softenable material the more heat will be required to soften it and, consequently, the longer the blowing time at a given current. This increased mass will slightly increase the minimum current required to soften the material but this effect on the rating of the device is so small as compared to the effect on the blowing time that a material increase in time lag results.

In order to make use of a considerable quantity of heat softenable material I prefer to interpose between the link and the heating element a heat and electric conducting member 11. This member is formed with a passageway therethrough of size and shape to permit the end 8 of the fuse link and an end of the heating element to be inserted therein and there maintained in electrical connection by the heat softenable material. This member makes for ease in assembly and permits the use of a relatively large amount of the heat softenable material. It also absorbs heat and retards the rate of temperature rise of the heat softenable material to provide additional increase in time lag.

As the amount of heat lost from this heat-absorbing member to the walls of the body will vary with the areas of their respective surfaces in contact, this member is so shaped that the area thereof which can contact the body wall is very small, for example it may have a thin flanged portion 12. The heat loss is thus kept small and greater uniformity of performance is obtained. This desirable characteristic more than compensates for any slight loss of time lag resulting from cutting down loss of heat to the body walls. I have found that the use of a relatively large quantity of heat softenable material without provision for restricting and rendering substantially uniform the conduction of heat therefrom to the walls of the body results in a lack of the uniformity of rating and blowing times essential in devices of the character of my invention.

The operating means 7, shown here as a helical spring, acts on the link at a point relatively near the heat softenable material which arrangement leaves the fusing portion of the link free from stress caused by the operating means. The other end of the operating means is so supported as to render the means substantially free from current flow therethrough.

The heating element 9 is a substantially flat strip of metal usually having higher specific electrical resistance than that of the fuse link and of such dimensions relative to the fuse link that it will remain unfused at ordinary overloads though it may sometimes fuse on heavy short circuit. I prefer to stamp the element from sheet metal but may use a wire. It is of relatively large mass for the purpose, also, of retarding its rate of temperature rise on overload for a reason to be explained later. I may make it of such metals as brass, German silver, or others of lower or higher specific resistance, as I may prefer. I may, if desired, so form an end portion of the heating element as to constitute the equivalent of the solder cup 11 to facilitate connection thereto and permit the use of a sufficient quantity of heat softenable material to increase the time lag by absorbing a substantial amount of the heat, or make other minor changes in its shape without departing from the simple form of the element as a whole. I make the end which is soldered to the contact terminal wider than the main body of the element in order to minimize the effect on the rating which might be caused by a difference in height of the solder by means of which connection with the contact terminal 4 is maintained.

By making my heating element in this simple form I am enabled at low cost to provide for ease in connection to both the fuse link and the contact terminal. I make easy the use of a substantial amount of solder at the connection to the link in order to absorb a substantial quantity of heat and I can cheaply and effectively counteract the effect of different solder heights at the connection to the terminal.

In order that the interrupter open as intended it is necessary that a certain amount of heat be generated in the heating element. If the heating element be formed of layers of wire wound close together the amount of metal therein to be heated will be relatively small, the one turn will tend to heat the adjacent turn and and radiation therefrom will be restricted. As a result the temperature rise will be relatively rapid. In a heating element such as used in my invention the mass of metal may be relatively great which makes for slower temperature rise. The cross-sectional area where connected to the contact terminal is relatively large which permits conduction of heat to the terminal. The element being substantially free from bends, radiation from one part of it can have substantially no effect on heating of a nearby part. The temperature of the heating element will accordingly rise slowly and a long time lag in the operation of the interrupter will result.

The fuse link 5 may be of any desirable material and may be of any desired design. In a preferred form I use copper as that is a desirable material for use in fuse links, when as in this case, provision is made to prevent the attainment of too high a temperature on currents too low to blow the link.

It will be noted that when I use copper and brass or German silver for the link and heating element respectively, I use metals the specific resistances of which are relatively far apart while their melting points are relatively close together. I am enabled to use material of relatively similar melting points because by my construction the operation of the protector does not depend on the difference in melting points of these parts of the device. I may also, if I prefer, use materials of similar specific resistances by suitably proportioning dimensions.

The heat softenable material 10 may be a low-melting point solder or alloy, in which case it can maintain the fuse link 5 and the heating element 9 in electrical connection with each other without the necessity of direct physical contact of link to element. On the other hand if the link and heating element are placed in direct physical contact with each other, or if both are in direct physical contact with the heat absorbing member 11, the electrical connection thus established between them may be maintained by a heat softenable material which is not electrically conducting, as a wax for example.

On the passage of a current through the device the heat softenable material 10 will be heated by the heating element and if the strength and duration of the current be sufficiently high this material will be softened to a degree where it will be unable to resist the force exerted by the operating means 7. In this case the operating means 7 will withdraw the end of the link constituting the movable contact member 8 from its connection with the heating element 9 and interrupt the circuit.

In order that this operation take place with relatively long time lag the mass of the heating element is made relatively large. It is preferably connected directly to the contact terminal 3 for the same reason, as conduction of heat from the heating element to the terminal is a factor in retarding the rate of temperature rise of the heating element and hence, of the heat softenable material.

By thus retarding the temperature rise in the heating element by making its mass relatively large and by conducting heat away from it to the contact terminal, I provide a further method for controlling the time of operation of the protector. By proportioning the dimensions of these members with reference to their physical characteristics I am able to regulate the amount of heat which must be generated to soften the heat softenable material.

On higher overloads the link will blow and interrupt the circuit before, for the reasons just given, the mechanical interrupter can operate. The protector will thus provide the quick operation necessary on high overloads as well as the delayed operation required at low overloads.

While I have shown and described a preferred form of my invention and referred to preferred materials which may be used therein, it is obvious that modifications in form and in choice of materials may be made within the scope of my invention.

What I claim is:

1. In a protector for electric circuits, a heating element having formed ends and being substantially prismatic in shape throughout the greater part of its length, said formed ends having a greater cross-sectional area than has the prismatic portion, a fuse link element, means in contact with one of the foregoing elements near the end thereof to hold them in electrical connection with each other and adapted to lose its holding power when heated above a predetermined temperature and circuit opening means adapted to break the electrical circuit in the protector when the holding means has lost its holding power, said fuse link having a fusing portion free from stress caused by the circuit opening means.

2. A unitary protector for electric circuits comprising a casing, a fuse link, and a thermally-controlled mechanically-operable circuit interrupter in the casing, said interrupter including a heat absorbing member having a shape adapted to restrict to a negligible amount direct conduction of heat therefrom to the casing.

3. In a protector for electric circuits comprising a casing, a fuse link and a mechanically-operable thermal circuit interrupter in the casing, said interrupter comprising a heating member and a heat absorbing member having a relatively thin flange thereon extending outwardly beyond the heating member and adapted to position the interrupter in the casing and to restrict conduction of heat to the casing.

4. A protector for electric circuits comprising a casing, a fuse link and a mechanically-operable thermal circuit interrupter in the casing, said interrupter including heat softenable material normally holding the interrupter in closed circuit position and adapted to lose its holding power when heated to a predetermined temperature, a heating element adapted to heat said heat softenable material, a member adapted to support a substantial quantity of said heat softenable material, to absorb heat and retard the rate of temperature rise of the heat softenable material, to position the interrupter in the casing, and to restrict and render substantially uniform the conduction of heat therefrom to the casing.

5. A plug type protector for electric circuits comprising a contact member in the bottom thereof, a contact member in the side wall thereof, a heating member consisting of a metal stamping rigidly mounted on the bottom contact member, a fuse link in series connection with the heating member and the side contact member, heat softenable material normally maintaining said series connection, circuit-opening means substantially free from current flow therethrough to break said series connection by moving a portion of the fuse link away from the heating member when the heat softenable material has been heated to a predetermined temperature, and heat-absorbing means arranged to conduct heat from the heat softenable material to retard its rate of temperature rise, said heating member being free of bending by the circuit-opening means.

6. A plug type protector for electric circuits comprising an enclosure of insulation material, a contact member in the bottom of the enclosure, a contact member in a side wall thereof, a rigid metallic heating member in the enclosure relatively remote from the side walls thereof and fixedly mounted on the bottom contact member, a fuse link in series connection with the heating member and the side contact member, heat softenable material normally maintaining said series connection, circuit-opening means substantially free from current flow therethrough arranged to break said series connection by moving a portion of the fuse link away from the heating member when the heat softenable material has been heated to a predetermined temperature, and heat-absorbing means arranged to conduct heat from the heat softenable material to retard its rate of temperature rise.

7. A plug protector for electric circuits having a central opening, a contact in the base thereof, a contact in the side wall thereof, a metallic heating member, a heat-absorbing member, and a fuse link member in series connection with said contacts, heat softenable material normally connecting two of said members and a circuit-opening member adapted to open the circuit on softening of the heat softenable material, the heating member and the circuit-opening member being so arranged that the side pull of the circuit opening member will be in substantially the same plane as the broader side of the heating member.

8. In a protector for electric circuits, a casing, a fuse link, heat softenable material normally maintaining the protector in closed circuit position, means for heating the heat softenable material, and a member adapted to hold the heating means out of contact with the wall of the casing, said member being so arranged that when in contact with said wall, it will afford a limited heat-conducting path to said wall.

9. A protector for electric circuits forming an enclosed structure and adapted to be inserted in a fuse holder, said protector comprising a fuse link and a thermally-controlled mechanically-operable circuit interrupter, said interrupter including a heating element consisting of a metal stamping, and a heat-absorbing member intermediate the link and the heating element, said heating member having a cross-sectional area substantially less than that of the heat-absorbing member and being for the greater part of its length relatively remote from the walls of the enclosure.

10. A plug type protector for electric circuits that is an enclosed structure and is adapted to be inserted in a fuse holder, said protector comprising a casing having a thermally-controlled mechanically and thermally operable circuit interrupter therein, said casing having a recess therein and a terminal at its base, said interrupter comprising a fuse link member, a heating member having one of its ends fixedly secured to the said terminal and having its other end extending into the said recess, said heating member comprising a resistance element having a length of current path therethrough substantially equal to the over-all length thereof, a low melting point material on the end of the said heating member that extends into the casing forming a joint of said members, that normally maintains an electrical connection between the fuse link member and the heating member, said heating member having a cross-sectional area that is quite small relative to the cross-sectional area of the said recess and a spring biasing the the fuse link to open circuit position.

11. In a plug type protector for electric circuits, a casing, a terminal in the base thereof, a terminal in the side wall thereof, a fuse link and a heating element in series relation between the terminals, said heating element being mounted on the base of the casing, a spring adapted to move the unsupported end of the heating element toward the side wall of the casing and a member mounted on the upper portion of the heating element to engage the wall of the casing and prevent movement of the heating element.

*12. In a fusible protective device, a rigid metal heating conductor of relatively small mass anchored at one end, a relatively large heat absorbent mass electrically and mechanically connected to the other end of said heating conductor and carried by said end, a flexible conductor, a relatively small mass of readily fusible metal electrically connecting one end of said flexible conductor to said heat absorbent mass, and means responsive to the fusing of said readily fusible metal to move said flexible conductor away from said heat absorbent mass, said heat absorbent mass being large as compared with the mass of said readily fusible metal to delay the fusing of the latter.*

*13. In a fusible protective device, a heating conductor anchored at one end, a heat absorbent mass of relatively infusible metal electrically and mechanically connected to the other end of said heating conductor and supported thereby, a flexible conductor, a relatively readily fusible metal electrically connecting one end of said flexible conductor to said heat absorbent mass at a point remote from said heating conductor, and means responsive to the fusing of said readily fusible metal to move said flexible conductor away from said heat absorbent mass, said heat absorbent mass being large as compared with the mass of said readily fusible metal to delay the fusing of the latter.*

*14. In a fusible protective device, a rigid conductor comprising a heating element anchored at one end, a heat absorbent mass of electrical conducting material fixed to the other end of said conductor, a flexible conductor arranged to fuse when traversed by currents in excess of a predetermined value, a readily fusible mass electrically connecting one end of said flexible conductor to said heat absorbent mass at a point remote from said heating conductor, and means responsive to the fusing of said readily fusible mass to move said flexible conductor away from said heat absorbent mass.*

*15. In a fusible circuit interrupter, a rigid supporting rod anchored at one end and having a hook at its other end, said supporting rod being formed of resistance material, a cylindrical plug formed of infusible electrical conducting material threaded on said hook, a flexible conductor, a mass of readily fusible material for electrically connecting the heat absorbent mass to one end of said flexible conductor and arranged to release said flexible conductor from said mass of heat absorbent material upon the fusing thereof, and means responsive to the fusing of said readily fusible mass for separating said heat aborbing mass and said flexible conductor.*

HENRY T. BUSSMANN.

REFERENCES CITED

The following references are of record in the file of this patent or the original patent:

UNITED STATES PATENTS

| Number | Name | Date |
|---|---|---|
| 953,393 | Parkhurst | Mar. 29, 1910 |
| 974,330 | Aalborg | Nov. 1, 1910 |
| 1,022,897 | Stevens | Apr. 9, 1912 |
| 1,276,567 | Price | Aug. 20, 1918 |
| 1,677,298 | Sandin | July 17, 1928 |
| 1,693,404 | Sandin | Nov. 27, 1928 |
| 2,111,749 | Bussmann | Mar. 22, 1938 |
| 2,113,155 | Kiefer | Apr. 5, 1938 |
| 2,168,815 | Wood | Aug. 8, 1939 |
| 2,210,036 | McEntee | Aug. 6, 1940 |
| 2,218,274 | Wood | Oct. 15, 1940 |

FOREIGN PATENTS

| Number | Country | Date |
|---|---|---|
| 587,795 | Germany | Nov. 8, 1933 |